US006237144B1

(12) United States Patent
Delo

(10) Patent No.: US 6,237,144 B1
(45) Date of Patent: May 22, 2001

(54) USE OF RELATIONAL DATABASES FOR SOFTWARE INSTALLATION

(75) Inventor: John C. Delo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/158,125

(22) Filed: Sep. 21, 1998

(51) Int. Cl.[7] .................................................. G06F 9/445
(52) U.S. Cl. ............................... 717/11; 709/221; 707/3; 707/10; 707/103 Z
(58) Field of Search .................................. 717/11; 713/1, 713/100; 709/203, 221; 707/10, 104, 203, 3, 103 R, 103 Z

(56) References Cited

U.S. PATENT DOCUMENTS

| | | | |
|---|---|---|---|
| 5,361,360 | * 11/1994 | Ishigami et al. | 717/11 |
| 5,560,026 | * 9/1996 | Manthuruthil et al. | 345/433 |
| 5,586,304 | * 12/1996 | Stupek, Jr. et al. | 717/11 |
| 5,835,777 | * 11/1998 | Staelin | 717/11 |
| 5,859,969 | * 1/1999 | Oki et al. | 709/203 |
| 5,870,611 | * 2/1999 | Shrader et al. | 717/11 |
| 5,933,647 | * 8/1999 | Aronberg et al. | 717/11 |
| 5,950,010 | * 9/1999 | Hesse et al. | 717/11 |
| 5,960,204 | * 9/1999 | Yinger et al. | 717/11 |
| 5,974,454 | * 10/1999 | Apfel et al. | 709/221 |
| 6,006,034 | * 12/1999 | Heath et al. | 717/11 |
| 6,006,035 | * 12/1999 | Nabahi | 395/712 |

OTHER PUBLICATIONS

Teri Schiele, "Windows 95 Application Setup Guidelines for Independent Software Vendors", Microsoft Corporation, May 1995, 13 pages.*
Retrieved from the Internet:<URL: wysiwyg://25/http://msdn.microsoft.com/library/techart/setup.html>.*
Automating Microsoft Transaction Server Client Installation. Product Info. Microsoft Corporation, Jun. 1997 [retrieved on 2000-02-29].*
Retrieved from teh Internet:<URL: wysiwyg://Main.Prod-info.6/http://msdn.mi...m/library/backgrnd/html/msdn$_{13}$install.html>.*
Kelly, M., "Gain Control of Application Setup and Maintenance with the New Windows Installer", Microsoft Systems Journal: Sep. 1998, pp. 15–27.

* cited by examiner

Primary Examiner—James P. Trammell
Assistant Examiner—Tuan Q. Dam
(74) Attorney, Agent, or Firm—Kilpatrick Stockton LLP

(57) ABSTRACT

A method and system for installing computer programs is provided where installation is accomplished based on an "as complete" description of the installed features, components and resources of the computer program. The necessary files and components required for installation of a given feature or component are determined by marking for installation any components which are not presently installed, preparing a script of required installation executions, and then executing the instructions to install the necessary files or components. Components are marked for installation or un-installation in temporary columns and rows which are dynamically added to data tables used to identify components and features which are available for installation. Individual components of a feature may be added or removed by simply marking that component for installation or removal. When the instructions in the installation script are executed, that particular component will be installed or removed according to the instructions. Installation of a given software application is streamlined because any component of a program application to be installed which is already installed on the user's computer need not be reinstalled upon the installation of the desired feature. Only components or files thereof which must be installed in addition to previously installed components or files need be installed for the installation of the software application program.

24 Claims, 5 Drawing Sheets

USE OF RELATIONAL DATABASES FOR SOFTWARE INSTALLATION

RELATED APPLICATIONS

This application is related to the following applications, all of which are filed on the same day as the present application and are assigned to the same assignee as the present application:
"System And Method For Repairing A Damaged Application"—Ser. No. 09/158,126, "Method And System For Restoring A Computer To Its Original State After An Unsuccessful Installation Attempt"—Ser. No. 09/158,124, "A Method For Categorizing And Installing Selected Software Components"—Ser. No. 09/157,695, "System And Method For Managing Locations Of Software Components Via A Source List"—Ser. No. 09/157,974; "Method For Optimizing The Installation Of A Software Product Onto A Target Computer System"—Ser. No. 09/157,853; "Software Installation And Validation Using Custom Actions"—Ser. No. 09/157,776; "Internal Database Validation"—Ser. No. 09/157,828; "Management Of Non-persistent Data In A Persistent Database"—Ser. No. 09/157,883; "Method And System For Advertising Applications"—Ser. No. 09/158,967; "Software Implementation Installer Mechanism"—Ser. No. 09/158,121.

TECHNICAL FIELD

This invention relates to computer program installation and more particularly relates to installation of computer programs using a data-driven model where installation is accomplished based on an "as complete" description of the installed features, components and resources of the computer program.

BACKGROUND OF THE INVENTION

In recent years, use of computers has increased dramatically worldwide. Users of computers utilize computer programs for a variety of purposes including word processing, database management, desktop publishing, and the like. In order to utilize a growing number of available computer programs, users must install the programs onto their individual computers or computer networks.

Applications today use a variety of installation technologies. For example, InstallShield, Seagate's WinInstall, or Great Lakes Software's Wise Installation System are commonly used tools for program installation. ActiveX® controls and other Web-page components often use IExpress packages, which are basically self-extracting executables with simple file copy and registry capabilities. Some functionality of computer programs like software drivers are able to use INF files, which are similar in capability of IExpress packages.

It is known in the art to install computer programs onto individual computers and computer networks using a procedural model for installation. According to a procedural model for installation of computer programs, installation is accomplished by following a regimented set of steps which describe how to get to an installed state. For example, a word processing program may be installed by following certain steps such as: (1) Launch word installation object; (2) Copy word primary executable file; (3) Copy dictionary; (4) Copy speller; and etc. Each such step may in turn require additional steps which creates a tree-based installation logic where an installation step leads to a branch of steps and then returns to follow other branches of steps. In the case of such procedural installation models, it often is quite difficult to turn on or turn off specific functions of a given computer program. That is, if the program developer desires to add or remove a desired function of a given computer program, the program developer or user often must enter a procedural installation sequence, such as described above, and add or remove a procedural step. Thus, making minor changes, for example installing a dictionary function to a word processing program, is a relatively cumbersome task.

Additionally, many of the desired functions of an application program to be installed may already be resident from a previously installed version or installation attempt. Some procedural installation models may be capable of recognizing the presence of previously installed functions of a computer program, but their tree-based logic often has trouble reacting once such a resource is found. If, for example, a newer version of a file is found on a computer, it might make sense for the current installation model not to copy an older file to the computer. But, if there are other functions, such as files or registry keys, associated with that file, the tree-based logic of a procedural installer model may have already written those associated files or registry keys to the computer's memory thereby creating a situation where older functions are coexisting with new functions. Even if no other functions have been copied to the computer at the moment, the decision not to copy related functions must be passed down the tree to other operations.

There is a need in the art for a method and system for installing computer programs and features, components and resources of computer programs where installation is accomplished based on an "as complete" description of the installed features, components and resources of the computer program. That is, there is a need for a method and system for installing a given computer software program or feature or component or resource of that program which describes how the desired installed program should look on the user's computer once the installation is complete. A "feature" is a granular piece of the product that a user may choose to install or execute. Features typically correspond roughly to the functional features of the program itself, such as a proofing tools feature or a word processing feature. A "component" is a collection of resources, such as files, shortcuts, or registry keys, that are all installed or un-installed as a unit. Components are the building blocks of the program that are not exposed to the user.

There is also a need in the art for a method and system for installing computer programs which allow for quick and efficient installation and un-installation of individual components of computer programs. There is further a need for a method and system for installing computer programs which track and utilize previously installed components of a computer program. There is also a need in the art for a method and system for temporarily and dynamically adding columns and rows to a data file for marking the installation status of the components and features of a computer program.

SUMMARY OF THE INVENTION

The present invention satisfies the above-described needs by providing a method and system for installing computer programs where installation is accomplished based on an "as complete" description of the installed features, components and resources of the computer program. Rather than installing a given feature or component of a computer program via a regimented set of procedural steps, the system and method of the present invention allow for installation by determining the necessary files and components required for installation of a given feature, marking for installation any components which are not presently installed, preparing a script of required installation executions, and then executing the instructions to install the necessary files or components.

Components are marked for installation or un-installation in temporary columns and rows which are dynamically added to data tables which identify components and features that are available for installation. The advantage over the procedural model is that individual components of a feature may be added or removed by simply marking that component for installation or removal. Then, when the instructions in the installation script are executed, that particular component will be installed or removed according to the instructions. Installation of a given software application is streamlined because any component of a program application to be installed which is already installed on the user's computer need not be reinstalled upon the installation of the desired feature. Rather, only components or files thereof which must be installed in addition to previously installed components or files need be installed for the installation of the software application program.

One aspect of the present invention provides a method of installing a computer program. Features of the computer program for installation are selected and components required for installation of the features are determined. Resources required for installation of the components are also determined. A script of instructions is generated for installation of the resources and the script of instructions is executed. Preferably, the determination of components required for installation of the features includes mapping each of the features of the computer program for installation to one or more components comprising each of the features. The installation status of each of the components is determined. In response to determining the installation status of each of the components, the components are marked with a desired installation status. The desired installation status may be installed or not installed.

Generating the script of instructions for installation of the resources can include creating a data file having a plurality of records. Each of the records is populated with an instruction for installation of a one of the resources. At least one of the records is populated with an instruction to execute the instructions.

In another aspect of the present invention a method for installing a computer program is provided. A data table of features of the computer program is queried and a data table of components of the features is queried. A determination is made as to which components identified in the data table of components must be installed. Other data tables for resources associated with the components to be installed is queried and a sequence file of instructions is generated for installing the resources associated with the components to be installed. After the sequence file is generated the instructions may be executed.

In order to determine which components must be installed, a first temporary data field is added to the table of components. The first temporary data field is marked to indicate the installation status of each component identified in the data table of components. A second temporary data field to the table of components is added and is marked to indicate the components to be installed.

In another aspect of the present invention, a computer-readable medium having stored thereon a data structure having multiple data fields is provided. A first data field contains data representing a component of a computer program. A first temporary data field contains data representing a current installation status of the component. A second temporary data field contains data representing a desired installation status of the component. Data in the second temporary data field is altered to represent the desired installation status based on the current installation status represented by data contained in the first data field.

Other objects, features, and advantages of the present invention will become apparent upon reading the following specification, when taken in conjunction with the drawings and the appended claims.

DETAILED DESCRIPTION OF THE DISCLOSED EMBODIMENTS

Figure 1:
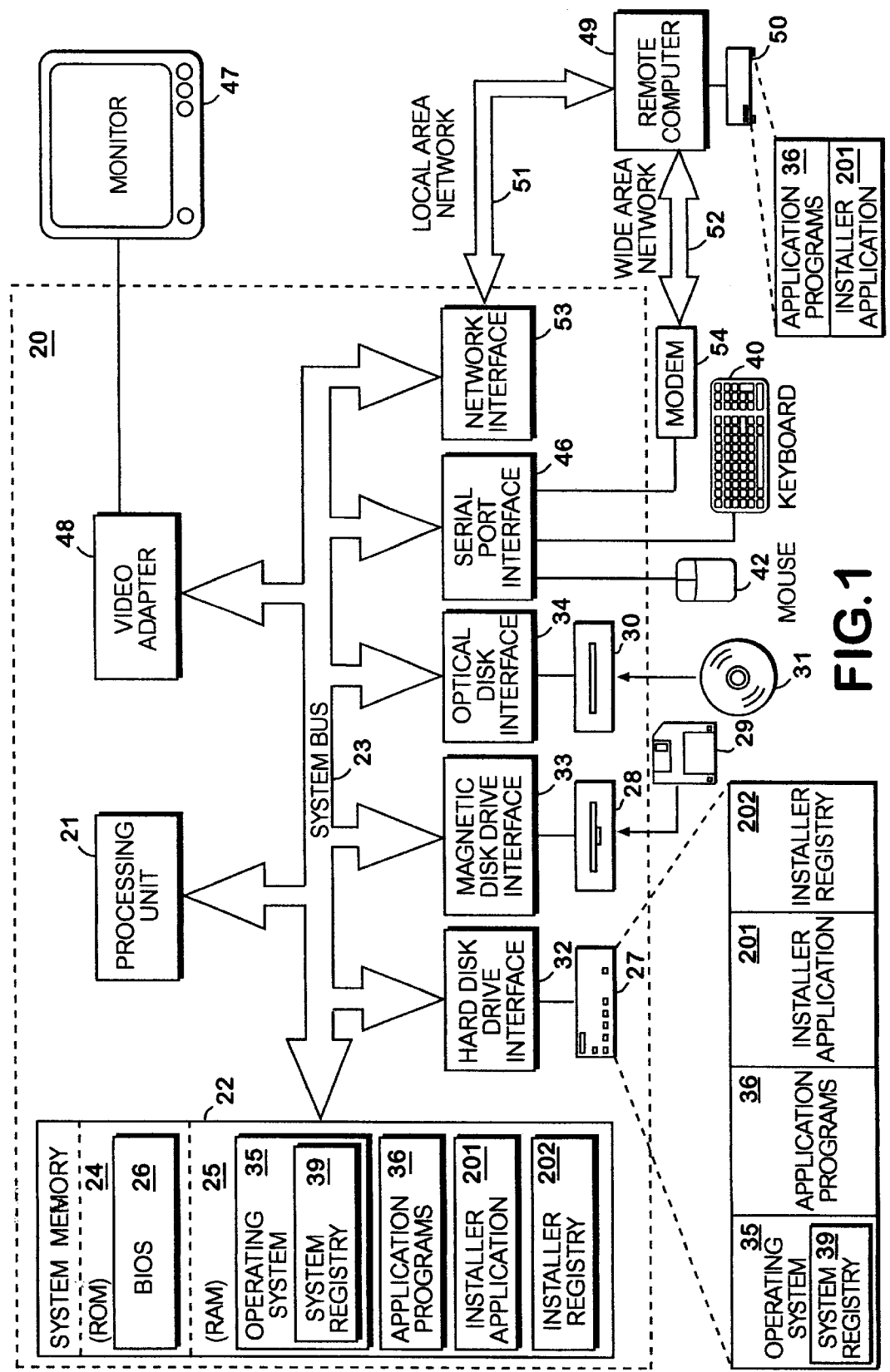
FIG. 1 is a block diagram of a personal computer that provides an exemplary operating environment for an embodiment of the present invention.

In accordance with an exemplary embodiment of the present invention, installation of a computer software product or application is performed via a data-driven model as opposed to a procedural-driven model as discussed in the background section above. The method and system of the present invention describes the state changes in the data required for installation of a software product, or the information required to determine such, and not the specific way of affecting those changes. The description of the installed data can work on a variety of software platforms, both present and future, and with different versions of the programs that effect the installation data state changes (installers). The present invention provides a standardized way of maintaining the installation data, using standard database operations. Information may easily be merged from several sources to build a more complex description of installation data, and the present invention allows customizations (transforms) to be dynamically applied in order to customize the installation process for various groups of software programs or to provide language translations on-the-fly.

When a user desires to install a given computer software product or feature or component of that product, the data-driven model of the present invention first examines the data which describes how the desired installed product should look on the user's computer once the installation is complete. Installation is then performed by placing the data in that "as complete" configuration. The method and system of the present invention differs from the procedural model discussed above because the procedural model describes how to arrive at the complete installation as opposed to describing how the complete installation should look on the user's computer prior to installation. The relational mode facilitates normalization of the data, such that each specification need only appear once, facilitating development, maintenance, modification, and localization. The data-driven model also needs to eventually produce a procedural list of operations to perform on the machine, but that task is handled by the present invention itself, and not by the setup developer. The procedural model requires that the setup developer handles that task.

The data-driven installation method and system of the present invention is accomplished using a relational database which contain information regarding the installation status of the features and components of the desired installed computer software product. When the user selects for example, a given feature of a computer software product (such as a word processing application), a determination is made as to which if any components of the desired installed feature are currently installed on the user's computer. Components which are not installed are marked for installation and any components which should be removed to accomplish the desired installation are marked for removal or un-installation. A determination is then made as to which data files should be installed or removed relative to the components which have been marked for installation or removal. It should be understood that term "installation" may include installation or un-installation actions.

At this point, the method and system of the present invention have described the required data for the complete installation of the feature selected by the user. A separate data file or script is then generated which is populated with instructions to the user's operating system for installing and/or removing the data files required to complete the installation of the components of the feature selected for installation by the user. The method and system of the present invention thus far described will now be described in detail.

The detailed description which follows is represented largely in terms of processes and symbolic representations of operations by conventional computer components, including a processor, memory storage devices for the processor, connected display devices, and input devices. Furthermore, these processes and operations may utilize conventional computer components in a heterogeneous distributed computing environment, including remote file servers, computer servers, and memory storage devices. Each of these conventional distributed computing components is accessible by the processor via a communication network.

The processes and operations performed by the computer include the manipulation of signals by a processor or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, values, elements, symbols, characters, terms, numbers, points, records, objects, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, calling, comparing, receiving, sending, reading, transferring, determining, routing, selecting, transmitting, etc. which are often associated with manual operations performed by a human operator. The operations described herein are machine operations performed in conjunction with various input provided by a human operator or user that interacts with the computer.

Referring now to the drawings, in which like numerals represent like elements throughout the several figures, aspects of the present invention and the preferred operating environment will be described.

Exemplary Operating Environment

FIG. 1 and the following discussion are intended to provide a brief, general description of the suitable computing environment in which the invention may be implemented. While the invention will be described in the general context of an application program that runs on an operating system in conjunction with a personal computer, those skilled in the art will recognize that the invention may also be implemented in combination with other program modules. Generally, program modules include routines, programs, components, data structures (such as tables or tree structures), etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communication network. In a distributed computing environment, program modules may be located in both local and remote memory storage devices.

Referring now to FIG. 1, an exemplary system for implementing the present invention includes a conventional personal computer 20, including a processor 21, a system memory 22, and a system bus 23 that couples the system memory 22 to the processor 21. The system memory 22 includes read only memory (ROM) 24 and random access memory (RAM) 25. A basic input/output system 26 (BIOS) is stored in ROM 24. The BIOS 26 essentially contains the basic routines that help to transfer information between elements within the personal computer 20 during certain computer operations, such as during start-up. The personal computer 20 further includes a hard disk drive 27, a magnetic disk drive 28 (e.g., that reads from and writes to a removable disk 29), and an optical disk drive 30 (e.g., that reads from an optical disk 31 or reads from or writes to other optical media). The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage for the personal computer 20. Although the description of computer-readable media above includes the hard disk drive 27, a removable magnetic disk 29 and a removable optical disk 31, such as a CD-ROM disk or DVD, it should be appreciated by those skilled in the art that other types of removable media which are readable by a computer, such as magnetic cassettes, flash memory cards, digital tapes, Bernoulli cartridges, and the like, may also be used in the exemplary operating environment.

A number of program modules may be stored in the drives and RAM 25, including an operating system 35, one or more program modules 36 (such as a word processing program module), other program modules 37. The operating system 35, in conjunction with the BIOS 26 and associated device drivers, provides the basic interface between the computer's hardware and software resources, the user, and program modules. A user may enter commands and information into the personal computer 20 through a keyboard 40 and an input or pointing device, such as a mouse 42.

Other input devices (not shown) may include a microphone, a key pad, a touch sensor, a joystick, a game pad, a satellite dish, a scanner, or the like. The keyboard 40, mouse 42, and other input devices are often connected to the processor 21 through a serial port interface 46, such as a game port or a universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote programmable devices, such as a remote computer 49. The remote computer 49 may be a server, a router, a peer device, or other common network node. Typically, the remote computer 49 includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the global Internet.

When used in a LAN networking environment, the personal computer 20 is connected to the local network 51 through a network interface 53. When used in a WAN networking environment, the personal computer 20 typically includes a modem 54 or other means for establishing communications over the wide area network 52, such as the global Internet. The modem 54, which may be internal or external, is connected to the system bus via the serial port interface 46. In a networked environment, program modules depicted relative to the personal computer 20, or portions thereof, may be stored in the remote memory storage device 50. It will be appreciated that the network connections shown are exemplary and other means of establishing a communications link between the personal computer 20 and the remote computer 49 may be used.

Discussion of Terminology

Figure 2:
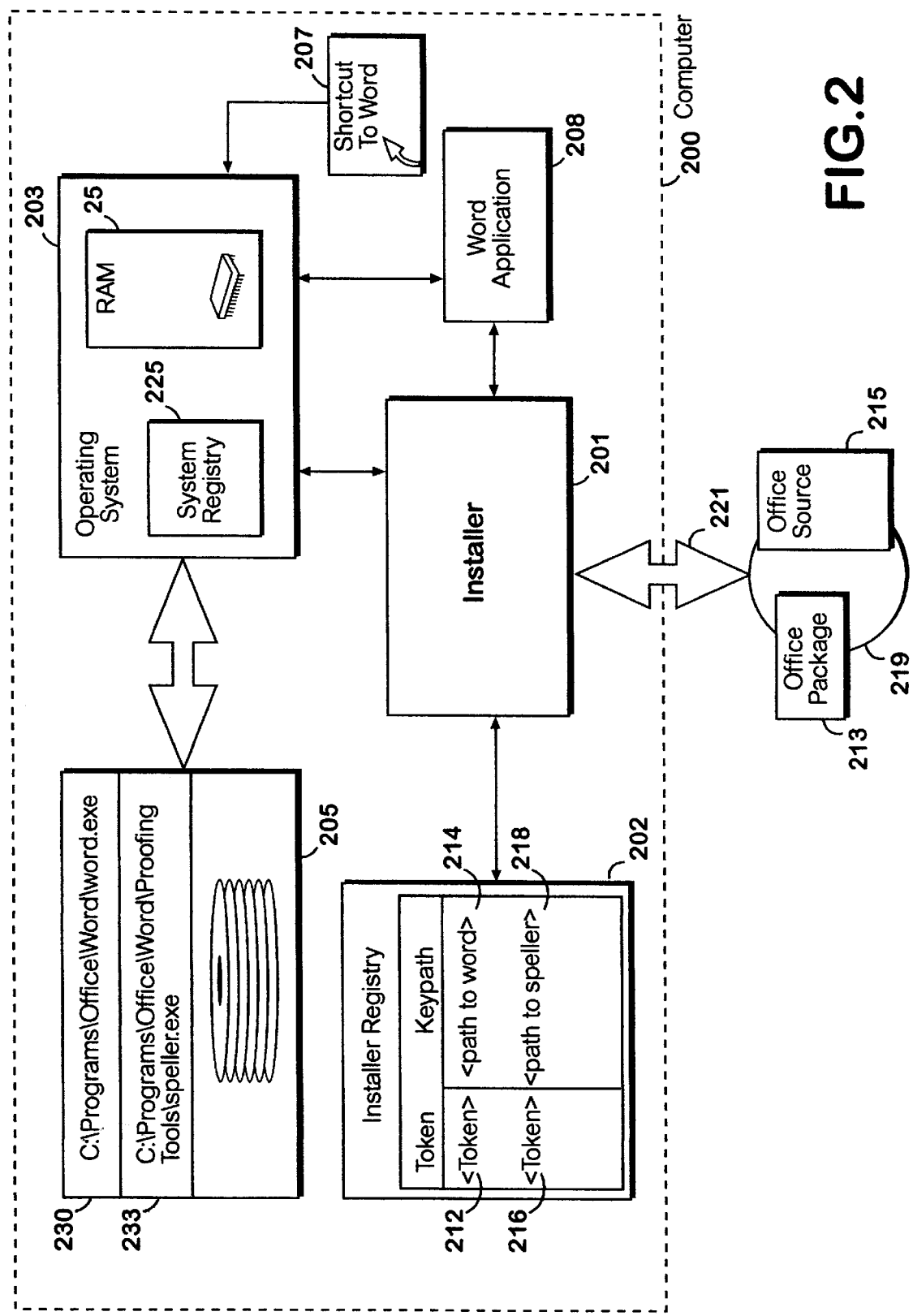
FIG. 2 is a functional block diagram of a computer making use of an exemplary embodiment of the installation method and system of the present invention.
Figure 3:
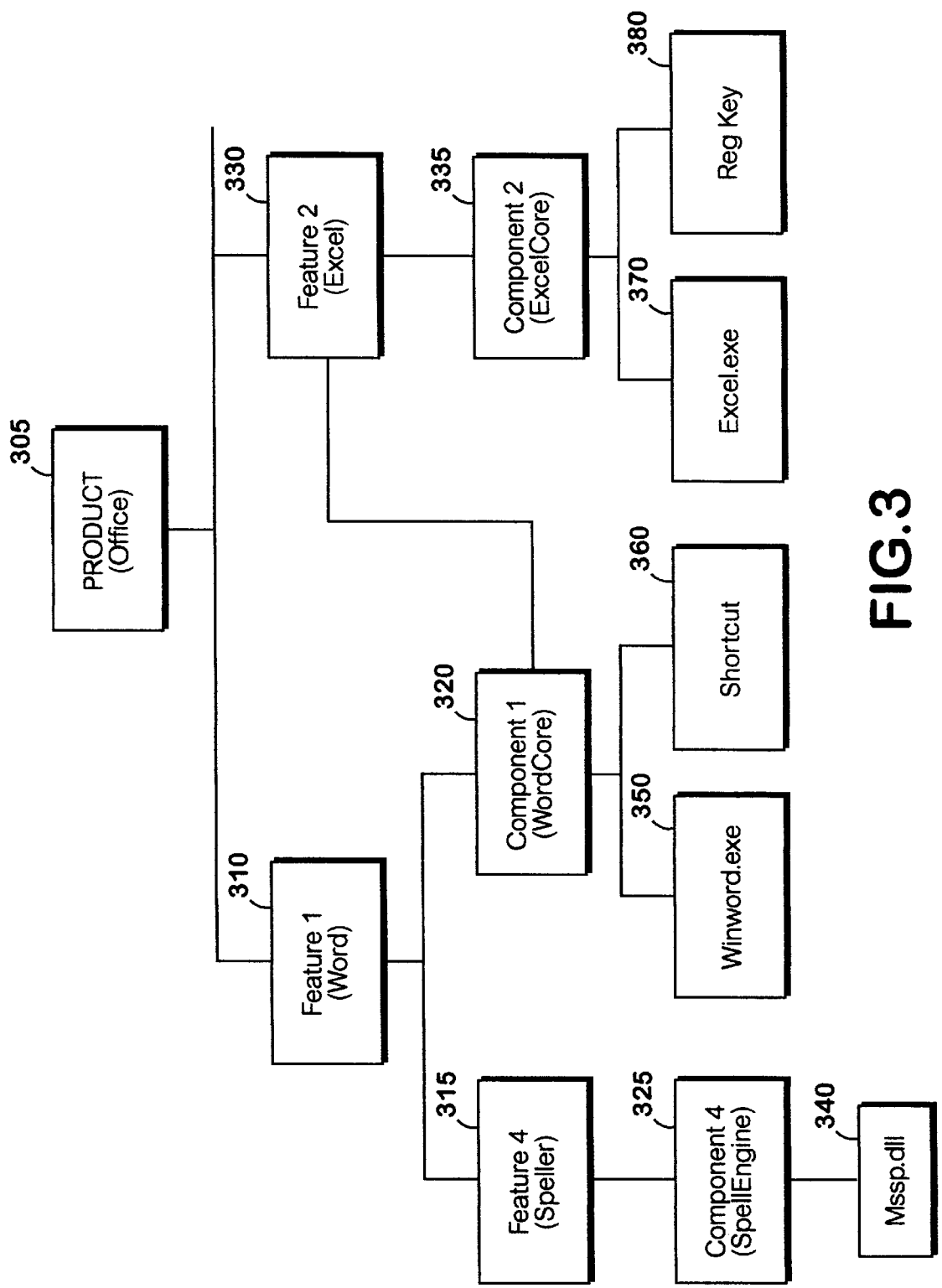
FIG. 3 is a simplified block diagram illustrating the relationship between computer software products, features, components, and resources according to the exemplary embodiment of the present invention.

Before discussing implementation of an exemplary embodiment of the present invention, a brief discussion of terminology related to the present invention is needed. Referring to drawings, FIG. 2 is a functional block diagram of a computer making use of an exemplary embodiment of the installation method and system of the present invention. FIG. 3 is a simplified block diagram illustrating the relationship between computer software products, features, components, and resources according to the exemplary embodiment of the present invention. As illustrated in FIG. 2, the installer application 201 recognizes three principal elements: products, features and components.

A "product" 305 may represent a single, entire application program, such as the Microsoft Office application program marketed by Microsoft Corporation of Redmond, Wash. Each product has a globally unique identifier known as a Product Code which allows products to be distinguished. Each product is made up of one or more features.

As briefly described in the background section above, a "feature" 310, 315, 320 is a granular piece of the product that a user may choose to install or execute. Features typically correspond roughly to the functional features of the product itself, such as a proofing tools feature or a word processing feature. As illustrated in FIG. 3, each feature is essentially a grouping of components and may also include other features. Features need not be globally unique, and therefore may be identified by any appropriate means, such as with a textual feature identifier.

A "component" 320, 325, 335 is a collection of resources 340–380, such as files, shortcuts, or registry keys, that are all installed or uninstalled as a unit. Components are the building blocks of the product that are not exposed to the user. Features may share components. For example, a word processing feature and a database feature may share a component, such as a spell checker component. A resource, such as a file or a registry key, may be part of only one component. Two components may not share the same resource whether they are part of the same product or parts of different products. One resource within the component is designated as a "key file." The key file may be any resource, such as a file or registry key, within the component.

Referring now to FIG. 2, a computer 200 is illustrated, such as conventional personal computer 20, illustrated in FIG. 1, including the installer application 201, an installer registry 202, an operating system 203, a hard-disk drive 205, a "shortcut" 207, and an executing application 208. Also illustrated are a package file 213 and a source 215. The package file 213 and the source 215 may reside on a CD-ROM disk 219 accessible to the computer 200 via an optical disk drive 30. The package file 213 and the source 215 may also exist in any other location accessible by the computer 200. The package file references the source files relative to the location of the package file itself, so that fixed relationship requires that the source reside at the same location as the package file itself. For instance, the source 215 may reside on CD-ROM disk 219 and the package file 213 may reside on remote computer 49 accessible via local area network 51 or via wide area network 52. The package file 213 and the source 215 are discussed in further detail below. The functionality and construction of the installer application 201 is best described by example, through the installation and execution of a product.

Implementation of an Exemplary Embodiment of the Present Invention

In implementation of an exemplary embodiment of the present invention, installation of a desired computer software product, or installation of a particular feature or component of that software product is accomplished using a relational database that the user's operating system utilizes to describe how the data required for the desired installation should look after the installation is complete. A detailed flow of the steps required in the installation of a desired computer software product's features or components thereof is discussed below. However, at this point it is advantageous to describe the relational database utilized by the method and system of the present invention for describing the data which will be installed on the user's computer after installation of the desired product feature or component is complete.

The present invention provides a relational installation database system that has a reduced persistent size. Persistent size is reduced by substituting all data elements in a database table, whether in the form of strings, objects, etc., with a single integer identifier. The integer identifiers are obtained from an index which maintains a sequential record of each unique occurrences of a data element. In effect, the data elements in a database table are aliased with integer identifiers and the relationship between the integer identifiers and the data elements is determined by accessing the index.

The data fields underlying a database table are two-dimensional data arrays. Aliasing the data elements of a database table with integers causes the data arrays to be uniform. Thus, manipulation of the data arrays is simplified. The present invention provides for the direct addition of temporary rows and columns to a database table by expanding and contracting the underlying data arrays. When temporary rows or columns are created, data elements in both the temporary and permanent rows and columns may be accessed and modified. When the temporary rows and columns are deleted, all data elements in the temporary rows and columns are lost, but changes to the data elements in the permanent rows and columns persist in the database.

An installation database that is aliased with integer identifiers may be quickly searched to locate data elements. As such, two or more aliased database tables may be quickly compared to determine differences and commonalties therein. Thus, aliased installation database tables may be efficiently merged together. This allows software developers to develop software in a modular fashion and to create an installation database for each module. Installation database tables may then be merged into a final installation database table that is shipped to the end-user. Further, differences between two or more installation database tables may be recorded in a transform database table. This transform may be applied to a database table in such a way that the changes are incorporated therein. Thus, software developers are able to provide enhancements, upgrades, patches, etc. to an end-user in the form of transform database tables, without the need for shipping an entire modified installation database.

Additional information on the structure and operation of the database tables described herein is found the U.S. patent application entitled "Method For Optimizing The Installation Of A Software Product Onto A Target Computer System"—Ser. No.09/157,853, filed on the same date as the filing date of the present application; which application is incorporated herein by reference.

Figure 4:
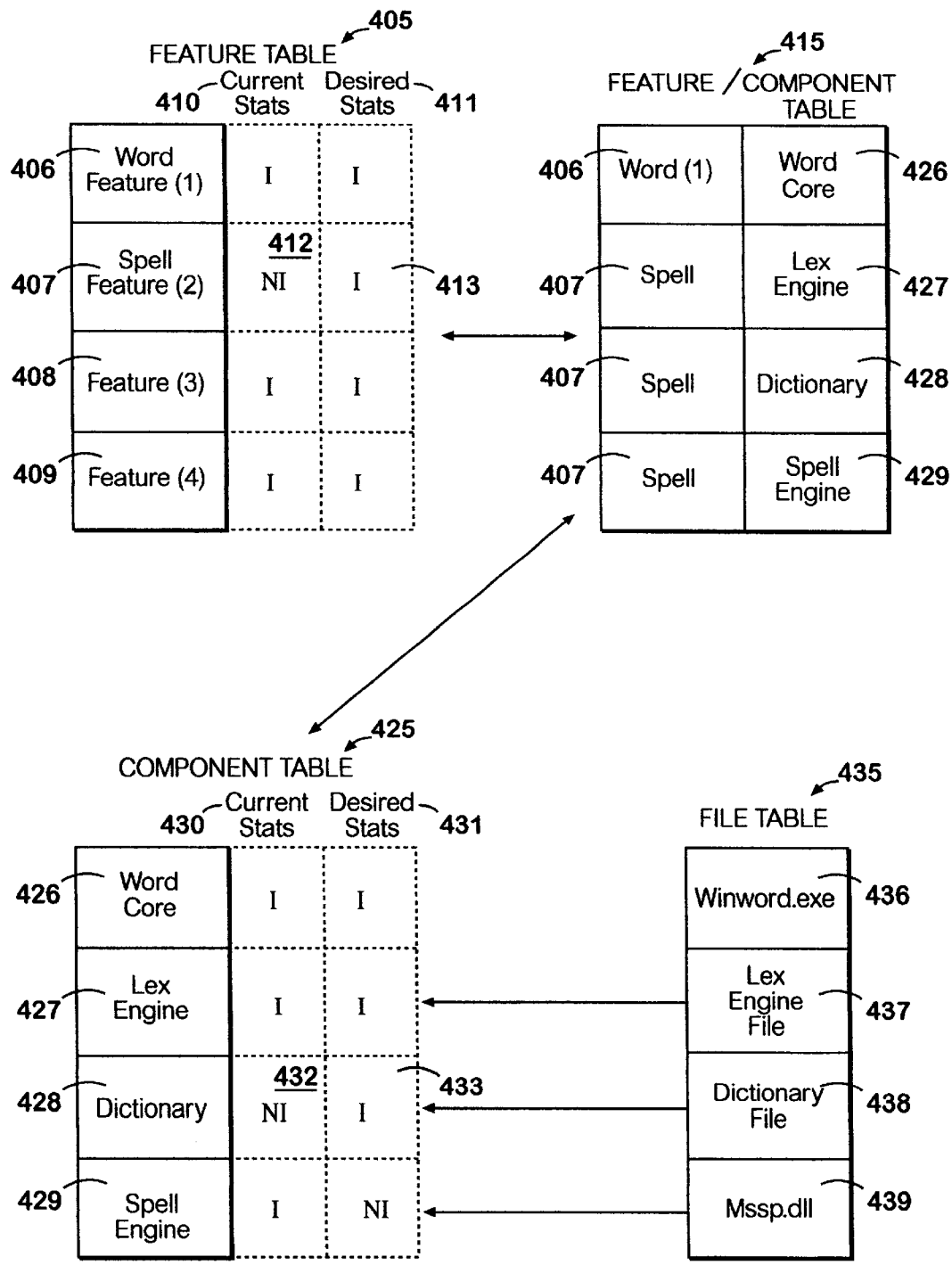
FIG. 4 is a simplified block diagram illustrating exemplary data table structure for maintaining data relating to computer software features, components, and resources according to an exemplary embodiment of the present invention.

Referring to FIG. 4, a simplified block diagram is shown illustrating exemplary data table structures for maintaining data relating to computer software features, components, and resources according to an exemplary embodiment of the present invention. The feature table 405 is a data table that contains records for data representing the features available for installation on the user's computer. As set forth above, the features available for installation on the user's computer are provided by the package 213. In the feature table 405, shown in FIG. 4, an exemplary set of features are provided including a word processing feature 406, a spelling feature 407, a feature 3 and a feature 4. It should be understood that the features shown in the feature table 405 are illustrative only and are not intended as a complete set of available features which may be installed in accordance with an exemplary embodiment of the present invention.

As discussed above, each feature is essentially a grouping of components, and as shown in FIG. 3, a given feature may share components with another feature. Accordingly, for each feature illustrated in the feature table 405, there exists one or more components which make up that feature. A subset of the components comprising the features illustrated in feature table 405 is illustrated in the component table 425, shown in FIG. 4. That is, the word core component 426, shown in component table 425, is a component of word processing feature 406, shown in the feature table 405. Likewise, the lex engine component 427, shown in the component table 425, is a component of the spelling feature 407, shown in feature table 405. Additionally, because a feature such as the spelling feature 407 may be comprised of numerous components, the dictionary component 428 and the spell engine component 429, illustrated in the component table 425, are also components of the spelling feature 407.

As illustrated in FIG. 4, a separate data table is provided called a feature/component table 415. The feature/component table 415 is used to map features defined by data contained in the feature table 405 to components of those features which are defined by data contained in the component table 425. Accordingly, as shown in FIG. 4, the spelling feature 407 is represented by three records in the feature/component table 415 because three components, including the lex engine component 427, the dictionary component 428, and the spell engine component 429 comprise the spell feature 407. The feature/component table 415 is utilized to join or link the features represented in the feature table 405 with their constituent components represented in the component table 425.

Referring still to FIG. 4, a fourth data table is illustrated as file table 435. As described in detail above, components are collections of installable resources, such as files, registry keys, shortcuts, etc. Therefore, the file table 435 contains data representing all the installable resources which make up the components defined by data contained in the component table 425. In the exemplary file table 435, illustrated in FIG. 4, the file table 435 contains records of data representing the winword.exe file 436, the lex engine file 437, the dictionary file 438, and the mssp.dll file 439. In the illustrative example shown, the file 438 is a resource of the dictionary component 428, and the file 439 is a resource of the spelling engine component 429. As should be understood by those skilled in the art, each resource illustrated in the file table 435 is uniquely mapped to a particular component and one resource cannot be shared by two different components. The file table is one of many resource tables.

In accordance with an exemplary embodiment of the present invention, prior to installation of a desired feature or component of a given computer software application, a determination is made of the current installation status of the features and components of the computer software application. This action preferably may be referred to as a "resolve components" action. To make this determination, a temporary data column with corresponding rows is dynamically added to the feature table 405 and to the component table 425. As shown in FIG. 4, the current state column 410 is added to the feature table 405 and the current state column 430 is added to the component table 425. Additionally, in concert with the determination of the current installation state of the features and components of the computer software application, a second temporary column is dynamically added to the feature table 405 and to the component table 425 in which information will be placed to represent the desired installation state of the features and components. As shown in FIG. 4, the desired state column 411 is added to the feature table 405 and the desired state column 431 is added to the component table 425.

In operation, prior to installation of a given component and/or feature, as dictated by the computer software application developer or by the user through a user interface, a determination is made as to the current installation state of the features and components of the computer software application. Once that determination is made, the current state column 410 of the feature table 405 and the current state column 430 of the component table 425 are marked according to the current installation state. In the illustration shown in FIG. 4, the features 406 and 408–409 illustrated in the feature table 405 are each marked with the letter "I" in the current state column 410 to represent a current installation state of "installed". The feature 407 is marked with the letters "NI" to designate the current installation state of that feature as "not installed". In the component table 425, the components 426, 427, and 429 are likewise marked as "installed", but the dictionary component 428 is marked in data record 432 to designate the current installation state of the dictionary component as "not installed". It should be understood that the letters "I " and "NI" for "installed" and "not installed" are for illustrative purposes only.

In a preferred embodiment of the present invention, the installation states for the components and features can be set to one of four states as follows:

(1) "installed on local hard disk" which indicates that files represented in the file table 435 are copied to the local computer's hard drive;

(2) "installed to run from source" which indicates that files represented in the file table 435 are left on the source, such as a compact disk or network share source, and the computer software application accesses those files from that source;

(3) "advertised" which indicates that files represented in the file table 435 are left on the source, but can be automatically copied down to the user's computer upon first use; and (4) "not installed." For components, "not installed" is really the same as "advertised"—components are not installed or registered when the features that contain them are either not installed or advertised.

After a determination is made as to the current installation state of the features and components represented in the feature table 405 and component table 425, the desired state column 411 of the feature table 405 and the desired state column 431 of the component table 425 are marked according to the desired installation state for the particular components and features represented in those tables. In the exemplary illustration shown in FIG. 4, the spelling feature 407 has a current installation state of "not installed" and a desired installation state of "installed". However, referring to the component table 425, the dictionary component 428 of the spelling feature 407 is marked with a current state of "not installed," but is marked with a desired installation state of "installed." Therefore, in accordance with an exemplary embodiment of the present invention, the dictionary component 428 of the spelling feature 407 has been selected for installation as discussed above.

In operation, the current installation state of the components represented in the component table 425 are marked first before marking the current installation state of the features represented in the feature table 405 because a feature is installed if all of the components which comprise that feature are installed. Accordingly, in the illustration shown in FIG. 4, because the dictionary component 428 is marked as "not installed," likewise the spelling feature 407 is marked as "not installed" in the feature table 405.

It should be understood that some components of a given feature may be "installed on local hard disk" while other components of the same feature may be "installed to run from source." In that case, the feature corresponding to those components would be marked as "installed to run from source." That is, if a single component of a given feature is being run from a source, such as a compact disk, then the corresponding feature will be marked as "installed to run from source."

The temporary columns added to the feature table 405 and to the component table 425, as discussed above, are temporarily and dynamically added to the data tables and utilized only during a given installation. That is, each time an installation is performed according to an exemplary embodiment of the present invention the temporary columns are dynamically added at that time. When the installation is complete, the temporary columns are deleted. In a preferred embodiment of the present invention, the feature table 405 and the component table 425 are opened in "read only" configuration. Accordingly, the data contained in those tables is permanent and unchangeable in the "read only" configuration. Data placed in the temporary columns for the purpose of marking the current and desired states of features and components represented in those data tables is maintained in those temporary columns only during the installation process. When the modified tables are no longer referenced, all data present in those tables is released. Since the data is not persistent, no change is made to the permanent data in the database. It should be understood that, if the tables are opened in a "read-write" configuration instead of "read only," the temporary columns and the information placed therein are still released upon completion of installation, and no change is made to the permanent data in the database.

Once the desired state column in a component table 425 has been marked to indicate the desired installation state upon the completion of installation, a query on the file table 435 is performed to determine which files are uniquely mapped to components which require a change in installation state. For example, with reference to the exemplary features, components and files illustrated in FIG. 4, the dictionary component 428 has a current installation state of "not installed," but has been selected for installation. Therefore, a query on the file table 435 results in a finding that the dictionary file 438 must be installed to effect an installation of the dictionary component 428. Likewise, the spelling engine component 429 has a current installation state of "installed," but has been marked for a desired installation state of "not installed." A query on the file table 435 with reference to the spelling engine component 429 results in a finding that the mssp.dll file is uniquely mapped to the spelling engine component 429. Therefore, that file must be un-installed to effect the desired installation state for the spelling engine component 429. It should be understood that other data tables exist which are uniquely mapped to components. For example, a separate table may exist for other installable resources such as shortcuts and registry keys. Individual installable resources from those tables would be mapped to components requiring a change in installation state as is described for the file table 435.

Figures 5, 6:
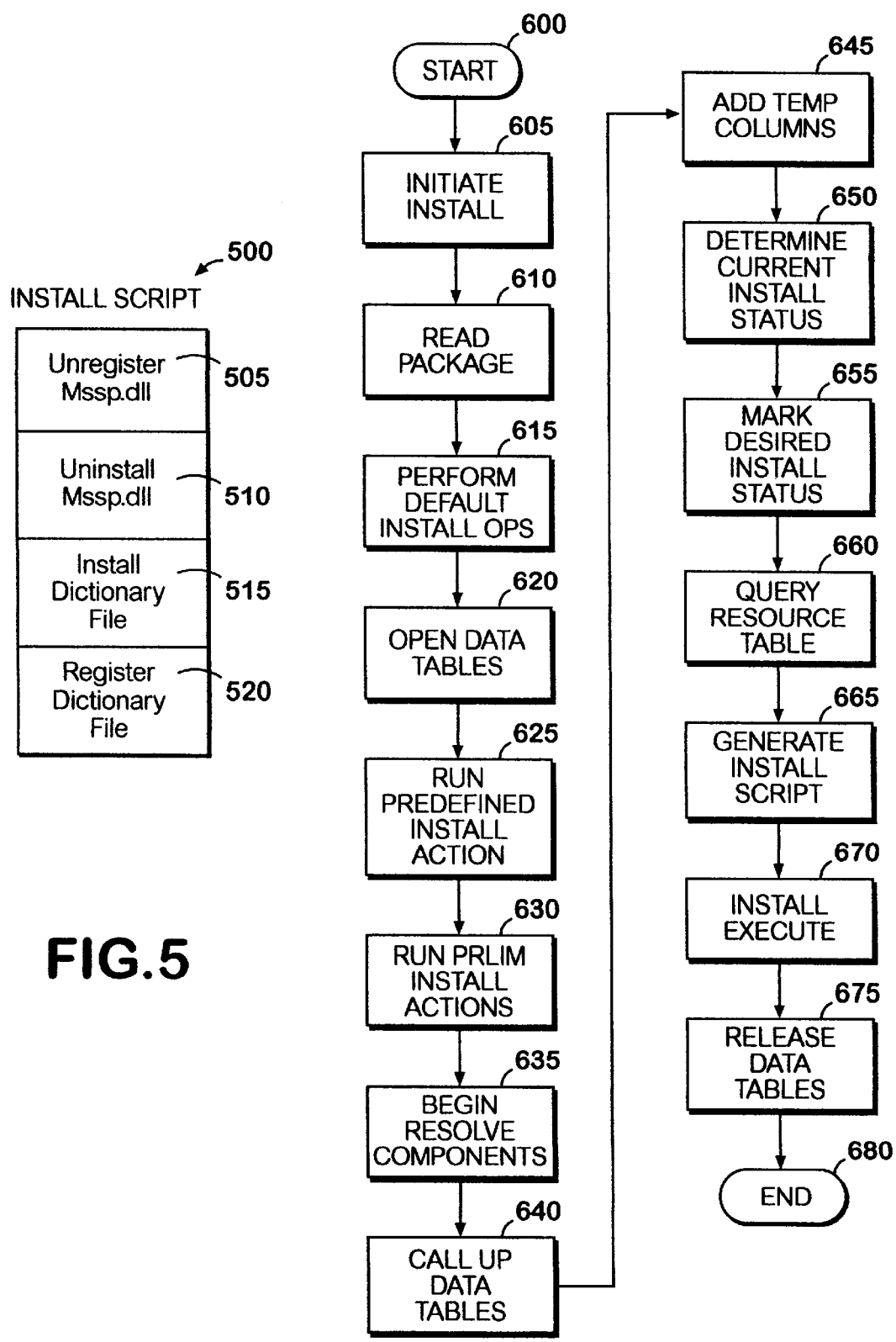
FIG. 5 is simplified block diagram illustrating exemplary data structure of an installation sequence record in accordance with an exemplary embodiment of the present invention.
FIG. 6 is a flow diagram illustrating exemplary steps for installing and un-installing particular computer software components in accordance with an exemplary embodiment of the present invention.

Referring now to FIG. 5, after the required installable resources, such as the files contained in the file table 435, are identified, a separate file is generated to contain instructions for execution of the desired installation. As shown in FIG. 5, an install script 500 is illustrated in which will be stored instructions for executing the desired installation. In the exemplary form shown in FIG. 5, the records 505 through 520 of the install script 500 contain information required to effect the installation illustrated in the data tables shown in FIG. 4. As shown in FIG. 4, the spelling engine component 429 has been marked with the desired installation state of "not installed." As discussed above, to effect that desired installation state, a query on the file table 435 resulted in a determination that the mssp.dll file must be un-installed. Accordingly, record 505 in the install script 500 is populated with an instruction to un-register the mssp.dll file 439. The record 510 of the install script 500 is populated with an instruction to un-install the mssp.dll file. The record 515 is populated with an instruction to install the dictionary file. The record 520 is populated with an instruction to register the dictionary file. In the preferred form shown in FIG. 5, the un-registration and un-install actions are accomplished before the install and registration actions.

As is well known to those skilled in the art, this order is accomplished to prevent removing information from the system registry and system memory which has been previously installed with the same name. As is known to those skilled in the art, un-registration means that the components and files thereof are to be removed and therefore the information which identified those components and files to the operating system will be deleted. Likewise, as is known to those skilled in the art, the un-install action will remove the files and components from system memory. It should be understood that the records shown in the install script 500 are illustrative only. That is, a variety of other installation and registration actions could be included for a variety of other installable resources which must be installed or un-installed.

As will be discussed in detail below, once the install script 500 is generated as described, the system executes the list of instructions contained in records 505 through 520 to install or un-install the respective installable resources or the respective components according to the desired installation state for those components. After the execution has been run and the installation state changes have been effected, the tables illustrated in FIG. 4 are released from memory and the temporary columns for current state and desired state which were added to the feature table 405 and component table 425 are not saved.

Operation of an Exemplary Embodiment

The method and system of an exemplary embodiment of the present invention is best illustrated by showing, as an example, how the method and system process a user's decision to install the dictionary component of the spelling feature of his or her word processing program application. The method and system of the present invention may be utilized to install computer software products and features and components of those products upon the first installation to a user's computer and/or upon subsequent installations. For example, after a user has initially installed a word processing product to his or her computer, the user may decide to un-install the dictionary component of the spelling feature of that word processing product to conserve memory capacity of his or her computer. The method and system of the present invention would be used to effect that un-install action. Likewise, if the user subsequently decided to re-install that component (as in the case of the present example) then the user would utilize the present invention for that re-install action. Additionally, the present invention may be utilized to install a new version of a given product, feature, or component. In that case, the present invention serves to streamline installation because the new version may use components that are already installed from the older version or components that are used by other features that have previously been installed.

Referring now to the drawings, FIG. 6 is a flow diagram illustrating exemplary steps for installing and un-installing particular computer software components in accordance with an exemplary embodiment of the present invention. To begin the example, at step 605, a user initiates the installation of the word processing product. It should be understood that the word processing product could be a feature of a larger product which contains other features, such as a data processing feature and a slide presentation feature. Initiating the installation may constitute the act of inserting a CD-ROM disk 219 in an optical disk drive 30, or the act of executing a remote startup script over a network connection, or any other means of initiating the installation. Once the installation is initiated, the installer application 201 assumes control of processing.

At step 610, the installer application 201 begins the installation by reading the package file 213 into memory, such as RAM 25. The package file 213 is unique to the product and is essentially a database which describes, among other things, the relationships between the features, components, and resources of the product, such as is illustrated in FIG. 3. The package file 213 may include the unique identifiers assigned to each of the features and components of the product. In the present example, the package file 213 contains all installation information and operating data for the word processing product being installed. It should be understood, however, that if the word processing product being installed is a feature of a larger product, as discussed above, the package file 213 preferably may contain installation and operating data on the entire larger product. This is advantageous because installation of a single feature, such as the word processing feature, will be streamlined because the word processing feature will share components with the other features of the larger product. Thus, if components which may be shared by the word processing feature are already installed from a previous installation, or from a previous version, those components need not be installed again during the present installation.

At step 615, the installer application 201 reads the package file 213 and uses the information stored within to determine the installation operations that must be performed for the product. That is, certain default installation actions may be set up by the developer of the word processing product to effect installation. Alternatively, the installer application 201 may display a user interface, such as a dialog box, which presents the user with the option of selecting which features of the product to install. For purposes of this discussion, references to installation include install actions and un-install actions. The user may be presented with the option of selecting a word processing feature or the user may be presented with the option of installing or un-installing a given feature of that word processing feature, such as the spelling feature of the present example. Additionally, the user may be prompted by a user interface if the user attempts to access and use functionality that has not been installed. For example, if the user attempts to use the dictionary functionality of the spelling feature of his or her word processing feature, the user may be prompted that the dictionary component is not installed. In response to the prompt via the user interface, the user may select for installation the spelling feature so as to effect the installation of the dictionary functionality via installation of the dictionary component of the spelling feature.

At step 620, the operating system extracts from the package file 213 and source 215 and places into read only memory the feature table 405, component table 425, the feature/component table 415, and resources tables such as the file table 435. At step 625, predefined top-level install actions are run which include default installation actions set by the developer of the word processing product or feature. Such top-level actions tell the installer program which sequence tables of predefined instructions to run. For example, such sequences tables are retrieved from the package file 213 and may include the following exemplary instructions: (1) Unregister all files that need to be unregistered (as determined by component states); (2) Remove all files that need to be removed (as determined by component states); (3) Install all files that need to be installed (as determined by component states); and (4) Register all files that need to be registered (as determined by component states). In the present example, one of those actions includes provision of a user interface which allows the user to select for installation the spelling feature of the word processing feature.

At step 630, in response to the predefined installation sequences, the operating system preferably executes a number of preliminary installation actions. In an exemplary embodiment of the present invention, these preliminary installation actions may include a "launch conditions" action to determine whether the feature being installed will properly run on the existing operating system. It should be understood to those skilled in the art that the launch conditions action may check for a variety of conditions such as sufficient memory capacity to install the desired feature and compatibility of the desired feature with the current version of the operating system. Other preliminary installation actions preferably may include an "application search" action which includes querying system memory to determine whether previous versions of the related software application or feature are installed on the user's system. As should be understood by those skilled in the art, the version search is performed by looking for files in various locations and by searching entries in the system registry.

For example, if the user has previously installed an older version of the word processing feature he or she is using, the application search will attempt to find the older versions so that the current installation will be compatible with the older versions. For example, certain components which were installed as a part of the older version may be used by the newer version currently being installed. Likewise, the newer version may make use of the installation locations of the components and resources of the previous version. Another preliminary installation action which preferably may be performed is a "resolve directories" action. As is well known to those skilled in the art, this action essentially includes a determination and verification by the operating system of the locations of and paths to the various components, resources, data and executable functions utilized by the operating system.

At step 635, a resolve components action is initiated. As discussed in detail above, this action includes the determination of components and features which must be installed in accordance with the desired installation. At step 640 then, the feature table 405, the feature/component table 415, and the component table 425 are called up for use by the operating system. At step 645, the "current state" and "desired state" columns are dynamically added to the feature table 405 and component table 425, as discussed above.

At step 650, a determination is made as to the current installation state of the features and components thereof which are required for the current installation. In the present example, because the installation is directed to the spelling feature of the user's word processing feature, the spelling feature 407 is implicated in the determination. As discussed above, the feature/component table 415 is used to locate the components which are associated with the spelling feature.

After a determination is made of the current installation state of the components of the spelling feature, the current state column 430 of the component table 425 will be marked accordingly. In the present example, the dictionary component 428 of the spelling feature 407 will be marked as having a current installation state of "not installed" at record 432. At step 655, the desired state column 431 of the component table 425 will be marked with the desired installation state. In the present example, the user has selected through a user interface that the dictionary component will be installed. Accordingly, record 433 in the desired state column 431 of the component table 425 will be marked for a desired state of "installed." At step 660, the file table 435 will be queried to determine that the dictionary file 438 is required for installation of the dictionary component 428. As discussed above, it should be understood that other required resources, such as shortcuts and registry keys, are also queried for installation as is done for the dictionary file 438.

At step 665, an install script 500, as illustrated in FIG. 5, is generated with records containing data representing instructions for the execution of the desired installation action. In the present example, a first record in the install script 500 will include the instruction to install the dictionary file 428. A second record included in the install script will include an instruction to register the dictionary file 438.

At step 670, the install execute instruction is performed which causes the instructions contained in the install script 500 to be executed one at a time. In an exemplary embodiment, the install execute instruction is contained in one of the predefined sequence tables discussed above. First, the dictionary file 438 will be copied from the source 215 and written to an appropriate location on the computer 200, such as to the hard-disk drive 205 or to a system registry 225 maintained by the operating system 203. Second, the dictionary file 438 will be registered in the system registry 225. At this point, if necessary, any changes in the registration information of the dictionary component 428 which includes the dictionary file 438 will also be performed. The appropriate location for a component on the computer 200 may depend upon the type of resources associated with the component (e.g., the dictionary file 438). For instance, if the component includes files, the component may be stored in the file system of the hard-disk drive 205. However, if the component includes registry keys, the component may be stored in the system registry 225. In addition, a component may include both files and registry keys, in which case files are stored in the file system of the hard-disk drive 205 and the registry keys are stored in the system registry 225. If the user identifies a particular location within the file system of the hard-disk drive 205 for a feature, then the installer application 201 will write the files of components associated with that feature to that particular location.

When a component and the resources thereof, are written to an appropriate location, the installer application 201 creates an entry in the installer registry 202 corresponding to the component. The entry includes an identifier for the component and a key path for the component. The component identifier includes a product identifier of the product installing the component and a feature identifier of the feature containing the component. Those skilled in the art may appreciate that a usage counter may be included to identify the number of features requiring a component. For instance, if more than one feature requiring a component is installed, the usage counter may prevent the component from being deleted if only one such feature is un-installed.

At step 675, the feature table 405, the component table 425, the feature/component table 415, and resources tables such as the file table 435 are released from read only memory. The temporary current state and desired state columns are not saved. At step 680, the method ends with the word processing feature installed on user's computer, including the spelling feature and the dictionary component of the spelling feature.

As described herein, the present invention provides for installing computer programs where installation is accomplished based on an "as complete" description of the installed features, components and resources of the computer programs. Features and components of a computer program are marked for installation or un-installation in temporary columns and rows which are dynamically added to data tables used to identify those components and features which are available for installation. Individual components of a feature may be added or removed by marking that component for installation or removal. When the instructions in the installation sequence file are executed, that particular component will be installed or removed according to the instructions. Installation of a given software application is streamlined because any component of a program application to be installed which is already installed on the user's computer need not be re-installed upon the installation of the desired feature.

While this invention has been described in detail with particular reference to exemplary embodiments thereof, it will be understood that variations and modifications can be effected within the spirit and scope of the invention as described herein and as defined in the appended claims.

What is claimed is:

1. A method of installing a computer program, comprising the steps of:
   selecting features of the computer program for installation;
   determining components required for installation of the features;
   determining resources required for installation of the components;
   generating a script of instructions for installation of the resources; and
   executing the script of instructions.

2. The method of claim 1, whereby the step of determining components required for installation of the features includes the step of:
   mapping each of the features of the computer program for installation to one or more components comprising each of the features;
   determining the installation status of each of said one or more components; and
   in response to determining the installation status of each of said one or more components, marking said one or more components with a desired installation status.

3. The method of claim 2, whereby the desired installation status is "installed."

4. The method of claim 2, whereby the desired installation status is "not installed."

5. The method of claim 1, whereby the step of generating a script of instructions for installation of the resources includes the steps of:
   creating a data file having a plurality of records;
   populating each of said plurality of records with an instruction for installation of a one of said resources; and
   populating at least one of said plurality of records with an instruction to execute said instructions.

6. The method of claim 5, whereby said instruction for installation of a one of said resources includes an instruction to install said one of said resources.

7. The method of claim 5, whereby said instruction for installation of a one of said resources includes an instruction to un-install said one of said resources.

8. The method of claim 1, whereby the step of selecting features of the computer program for installation includes selecting features of the computer program for installation via a user interface.

9. The method of claim 1, whereby the step of selecting features of the computer program for installation includes selecting features of the computer program for installation according to a predefined set of features required for installation of the computer program.

10. A method for installing a computer program, comprising the steps of:
    querying a first data table of features of the computer program;
    querying a second data table of components of the features;
    determining which components identified in the second data table of components must be installed;
    querying a third data table for resources associated with the components to be installed; and
    generating a script of instructions for installing the resources associated with the components to be installed.

11. The method of claim 10, further comprising the step of:
    executing the instructions for installing the resources.

12. The method of claim 11, whereby the step of determining which components identified in the second data table of components must be installed, comprises the steps of:
    adding a first temporary data field to the table of components;
    adding a second temporary data field to the table of components;
    determining the installation status of the components identified in the second data table of components;
    marking the first temporary data field to indicate the installation status of each component identified in the second data table of components; and
    in response to marking first temporary data field, marking the second temporary data field for components to be installed.

13. The method of claim 12 whereby the step of querying a third data table for resources associated with the components to be installed includes querying the third data table of resources for components marked for installation in the second temporary data field.

14. A computer-readable medium having stored thereon a data structure having multiple data fields, comprising:
    a first data field containing data representing a component of a computer program;
    a first temporary data field containing data representing a current installation status of the component;
    a second temporary data field containing data representing a desired installation status of the component, wherein data in the second temporary data field altered to represent the desired installation status based on the current installation status represented by data contained in the first data field;

wherein the installation status of the component is altered in accordance with the desired installation status if the desired installation status and the current installation status are different; and wherein the installation status of the component is not altered if the desired installation status and the current installation status are not different.

15. A computer-readable medium on which is stored a computer program for installing a computer program module, the computer program comprising instructions, which when executed by a computer, perform the steps of:

selecting features of the computer program module for installation;

mapping each of the features of the computer program for installation to one or more components comprising each of the features;

determining the installation status of each of said one or more components; and in response to determining the installation status of each of said one or more components, marking said one or more components with a desired installation status;

determining resources required for installation of the components according to the desired installation status;

generating a script of instructions for installation of the resources; and executing the script of instructions.

16. The method of claim 15, whereby the desired installation status is "installed."

17. The method of claim 15, whereby the desired installation status is "not installed."

18. The method of claim 15, whereby the step of generating a script of instructions for installation of the resources includes the steps of:

creating a data file having a plurality of records;

populating each of said plurality of records with an instruction for installation of a one of said resources; and populating at least one of said plurality of records with an instruction to execute said instructions.

19. A system for installing a computer program, comprising:

a control module operative, to select features of the computer program module for installation;

to map each of the features of the computer program for installation to one or more components comprising each of the features;

to determine the installation status of each of said one or more components;

in response to determine the installation status of each of said one or more components, marking said one or more components with a desired installation status;

to determine resources required for installation of the components according to the desired installation status;

to generate a script of instructions for installation of the resources; and to execute the script of instructions.

20. The system of claim 19, whereby the desired installation status is "installed."

21. The system of claim 19, whereby the desired installation status is "not installed."

22. A method for installing a computer program using related databases, comprising the steps of:

storing in a first database information representing computer program features;

storing in a second database information representing installable components of the features;

mapping the information stored in the second database to the information contained in the first database using a mapping table;

marking the second database with the current installation status of the installable components represented by data stored in the second database;

marking the second database with the desired installation status of the installable components represented by data stored in the second database; and in response to marking the second database with the desired installation status, storing in a third database information representing instructions for installing the components according to the desired installation status.

23. A method for installing a computer program, comprising the steps of:

querying a first data table of features of the computer program;

querying a second data table of components of the features;

determining which components identified in the second data table of components must be installed comprises the steps of:

adding a first temporary data field to the table of components, adding a second temporary data field to the table of components, determining the installation status of the components identified in the second data table of components, marking the first temporary data field to indicate the installation status of each component identified in the second data table of components, and in response to marking first temporary data field, marking the second temporary data field for components to be installed;

querying a third data table for resources associated with the components to be installed;

generating a script of instructions for installing the resources associated with the components to be installed; and executing the instructions for installing the resources.

24. A method for installing a computer program, comprising the steps of:

querying a first data table of features of the computer program;

querying a second data table of components of the features;

determining which components identified in the second data table of components must be installed comprises the steps of:

adding a first temporary data field to the table of components, adding a second temporary data field to the table of components, determining the installation status of the components identified in the second data table of components, marking the first temporary data field to indicate the installation status of each component identified in the second data table of components, and in response to marking first temporary data field, marking the second temporary data field for components to be installed;

querying a third data table for resources associated with the components to be installed by querying the third data table of resources for components marked for installation in the second temporary data field;

generating a script of instructions for installing the resources associated with the components to be installed; and executing the instructions for installing the resources.

* * * * *